United States Patent
Riemma

(10) Patent No.: US 7,204,203 B2
(45) Date of Patent: Apr. 17, 2007

(54) AQUARIUM WATER CHANGING AND WATER STABALIZATION SYSTEM

(75) Inventor: Vincent Riemma, P.O. Box #489, Glenmont, NY (US) 12077

(73) Assignee: Vincent Riemma, Glenmont, NY (US)

( * ) Notice: Subject to any disclaimer, the term of this patent is extended or adjusted under 35 U.S.C. 154(b) by 0 days.

(21) Appl. No.: 10/615,577

(22) Filed: Jul. 8, 2003

(65) Prior Publication Data

US 2006/0225661 A1  Oct. 12, 2006

(51) Int. Cl.
*A01K 63/02* (2006.01)

(52) U.S. Cl. ..................... 119/248; 119/224

(58) Field of Classification Search .............. 119/224, 119/226, 227, 248, 249
See application file for complete search history.

(56) References Cited

U.S. PATENT DOCUMENTS 5,593,574 A * 1/1997 VanToever .................. 210/150
5,605,115 A * 2/1997 Dale .......................... 119/249
6,244,219 B1 * 6/2001 Krum ........................ 119/245

* cited by examiner

*Primary Examiner*—Robert P. Swiatek
(74) *Attorney, Agent, or Firm*—Hoffman, Warnick & D'Alessandro LLC

(57) ABSTRACT

An aquarium water changing and stabilization system consists of an initial tank designed to stabilize and condition water before it is entered into a subsequent tank that contains live aquatic animals such as fish. This system has a cabinet that is designed to aesthetically enclose, protect and support the components of the aquarium while providing access to the system. Water is introduced into the system from existing hot and cold water plumbing which is connected to this system. Water exits from this system into existing sewerage plumbing which is also connected to this system. Conditioned water from the conditioning tank enters the main fish tank via plumbing from one tank to the other. In case too much water is introduced to either tank, overflow drains in both tanks prevent water from overflowing over the top of either tank. Plumbing check valves and ball valves create safe and easy plumbing.

1 Claim, 6 Drawing Sheets

US 7,204,203 B2

AQUARIUM WATER CHANGING AND WATER STABALIZATION SYSTEM

BACKGROUND OF THE INVENTION

This invention relates to an aquarium that is designed to maintain a healthy environment for aquatic life by giving one the ability to balance and stabilize water in a separate enjoined tank before inducing the water into the main aquarium tank. Secondly, this aquarium water changing and water stabilization system prevents unnecessary work related to aquarium maintenance.

BRIEF SUMMARY OF THE PRESENT INVENTION

The inventor, who is an aquarium enthusiast, noted that it is difficult to change a substantial amount of water in a medium to large aquarium. For example, not having running water that runs directly into the aquarium system requires one to use pails and hoses that can cause a mess. Also, taking water directly from an exterior source and introducing it into the aquarium can be detrimental to the health of the living organisms in the aquarium. By attaching a second tank to the main aquarium tank through which water can be transferred, water can be conditioned and stabilized in the secondary tank before being introduced into the main aquarium tank. Also, by attaching an overflow and drainage system from both tanks to an existing sewer connection, allows for fast and safe removal of unwanted aquarium water. Redundant check valves and ball valves must be strategically placed to prevent backflow, valve failure backup and easy use.

As with most medium to large aquarium cabinetry, structural integrity and functionality are important so as to provide support and easy accessibility for the total aquarium system. In this present invention, the second water conditioning and stabilization tank is located above the main aquarium talk which is a gravity-flow water changing system. Plumbing runs behind and below both tanks.

As with most medium to large aquarium cabinetry, structural integrity and functionality is important so as to provide support and easy accessibility for the total aquarium system. In this present invention, the second water conditioning and stabilization tank is located above the main aquarium tank which is a gravity-flow water changing system. Plumbing runs behind and below both tanks.

The cabinet is designed to support the weight of both tanks when full and allow proper access to all working components of the aquarium.

This invention allows aquarium water to be easily stabilized and conditioned before being introduced into the main aquarium tank and allows for water to be easily and quickly drained from the aquarium while supporting all the components of the aquarium in a modular cabinet unit that provides easy access to all the important components of the aquarium.

BRIEF DESCRIPTION OF THE DRAWINGS

Other features and objects of the invention will be apparent from the following specification drawings, all of which disclose non-limiting embodiments of the invention. In the drawings.

DESCRIPTION OF THE PREFERRED EMBODIMENTS

The present invention is a saltwater or freshwater mixing tank and aquarium environmental control system which is designed to exchange used water for pre-conditioned and stabilized water and can be used to quickly drain the main fish tank for easy cleaning and refilling. This invention is designed to connect to existing plumbing both drainage and water supply at the location that the aquarium is installed. Secondly, the current invention requires a cabinet that provides access to the components of the aquarium and proper support. The present invention is designed as a complete modular unit that does not allow for various embodiments within the design of the aquarium. Instead, all of the necessary aquarium components are designed and assembled to work together when connected to existing plumbing. The present invention is a manual aquarium water changing and water stabilization system. Future designs will allow for other tank position setups and aesthetics.

Figure 1:
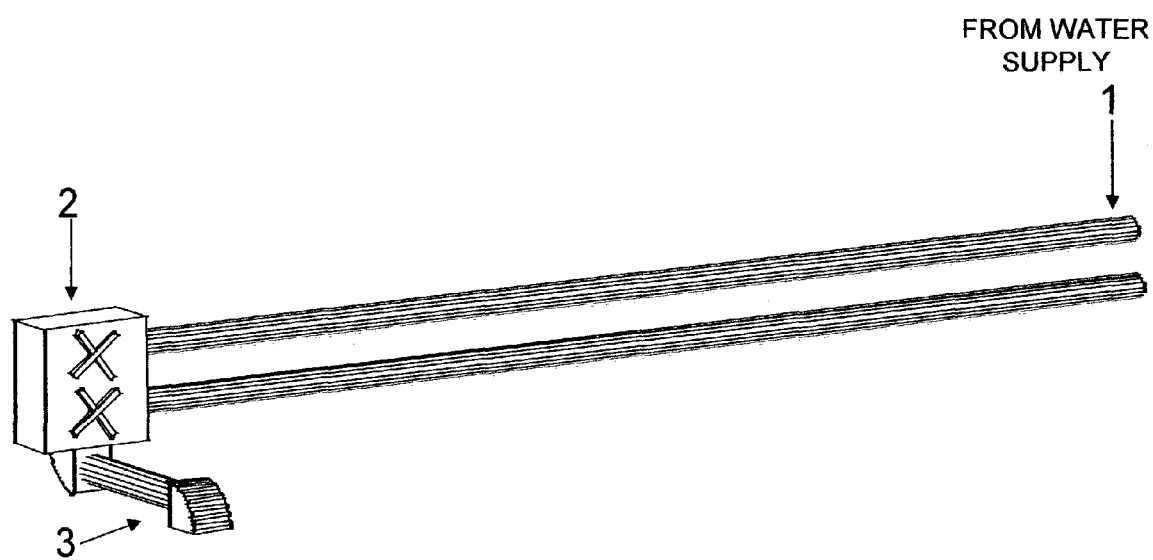
FIG. 1 is a close up view of the valve for the top tank of the aquarium from a perspective slightly above and to the right of the aquarium.

As depicted in FIG. 1 the present invention includes ½ inch copper supply lines 1, for hot and cold water. A valve body 2, that is bracketed to the left side of the cabinet mixes hot and cold water which exits thru the neck of the valve 3.

Figure 3:
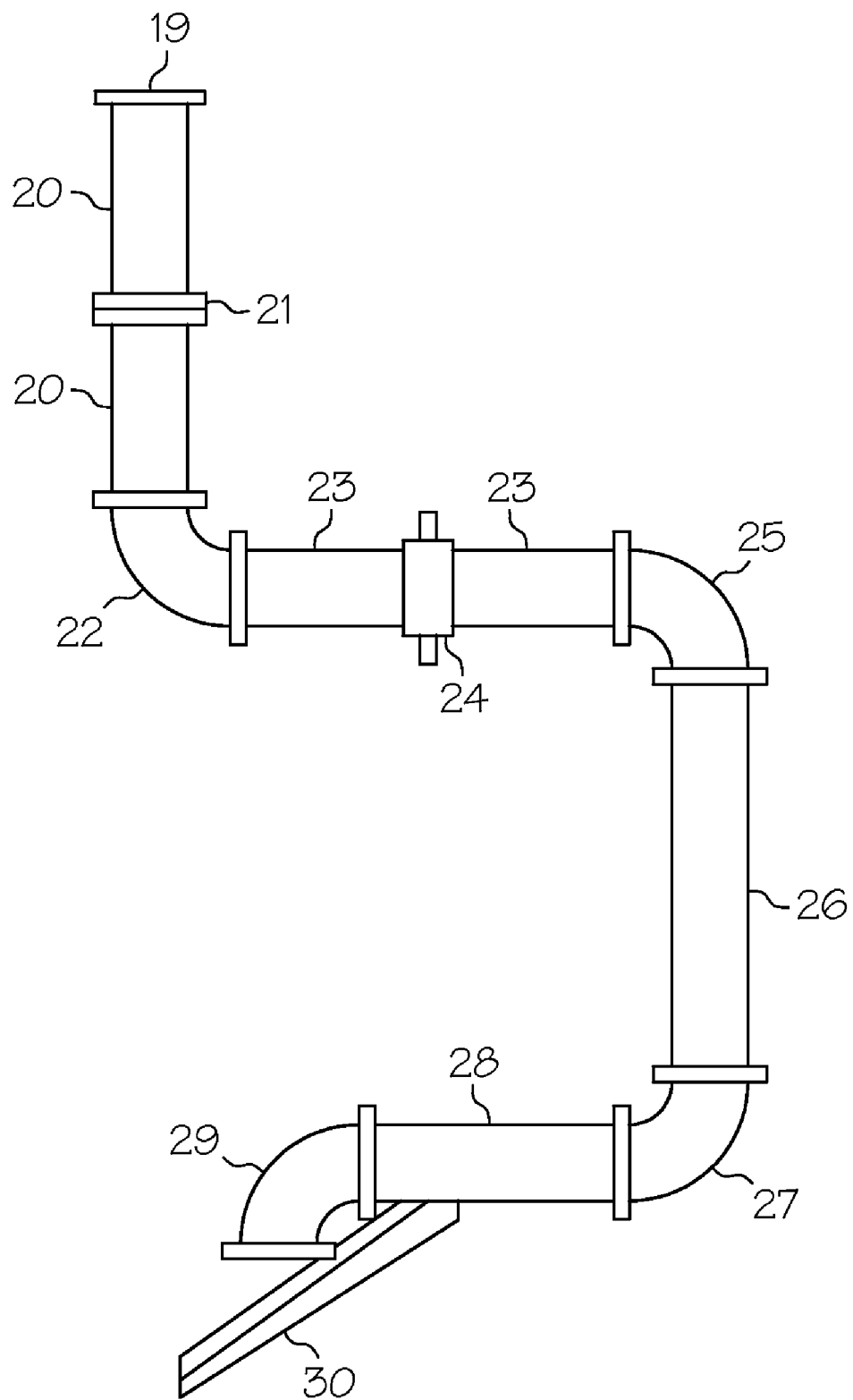
FIG. 3 is a sectional right side view of the plumbing that leads from the bottom of the top tank into the back of the lower tank that introduces conditioned water into the lower main fish tank. The splash guard that buffers the water entering into the lower main fish tank is visible at the very bottom of this figure.
Figure 4:
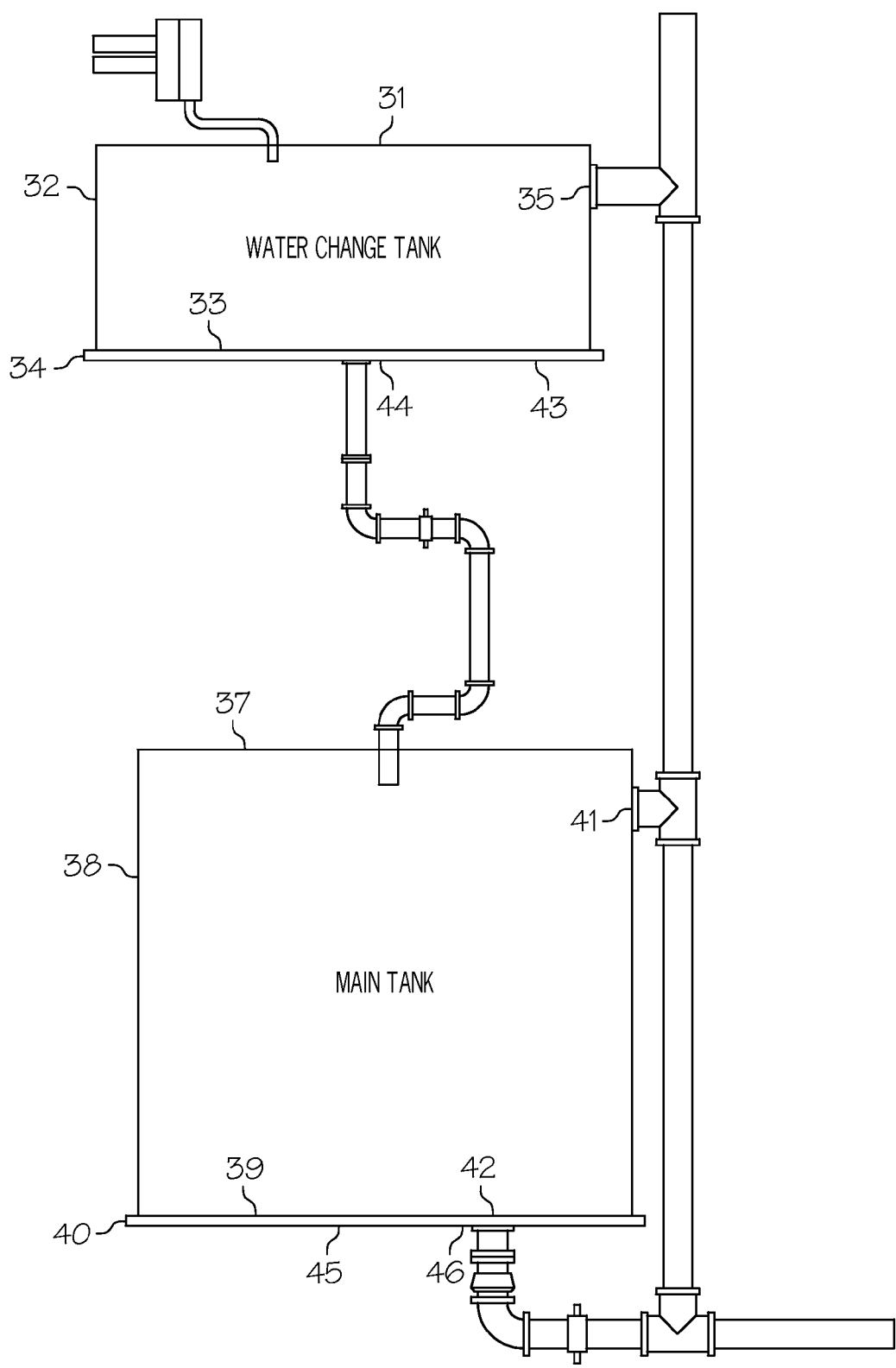
FIG. 4 is a sectional front view of the tanks, tank shelves and plumbing only.

As depicted in FIG. 4 the top water change tank 32, can be filled with water that will empty into the main fish tank 38, thru piping system (see FIG. 3) that empties from the bottom of the water change tank 32 and exits into the top of the main fish tank 38. In the case of an overfilling of the tanks, an 1.5 inch overflow drain piping system (see FIG. 2) allows for proper overflow drainage for both tanks.

Figure 2:
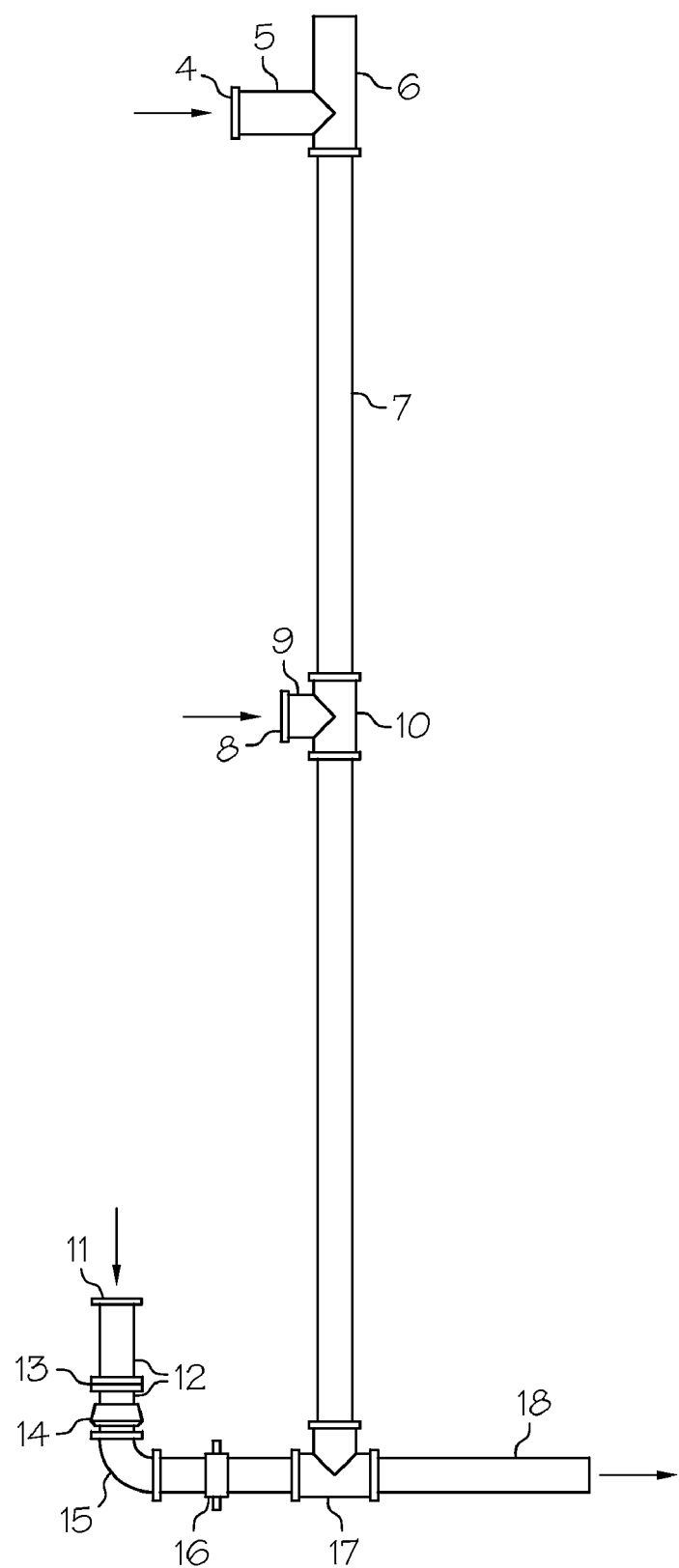
FIG. 2 is a right side sectional view of the overflow drainage plumbing only for the aquarium.

As depicted in FIG. 2 the present invention includes an overflow drainage flange 4 that secures a horizontal 2.3 inch length of 1.5 inch pipe 5, to the back of the upper part of the top water change tank (FIG. 4, 32). In FIG. 2, this pipe empties into a vertical 90° tee connector 6, which connects to a vertical segment of pipe that serves both as a connector and vent opening for the overflow drain system. Two vertical segments of pipe 7 are connected with a vertical 90° tee connector 10, the top vertical pipe segment is approximately 20 inches long and the bottom vertical pipe segment is approximately 26 inches long. The segments of pipe and the 90° tee connector total 47.5 inches. A 1.5" diameter double threaded bulkhead fitting 8, is put through the back of the upper part of the main fish tank (FIG. 4, 38) and is connected to a horizontal 2.3 inch length of 1.5" diameter pipe 9 which connects to the vertical 90° tee 10.

The bottom of the 47.5 inch vertical overflow pipe segment 7 connects to a horizontal 90° tee connector 17. Main fish tank water empties from a drain at the bottom of the main fish tank (FIG. 4, 38). As depicted in FIG. 2, a 1.5" diameter double threaded bulkhead goes through the bottom of the main fish tank and connects to a vertical piece of pipe 12 that contains an inner check valve 13, to prevent backflow. This vertical drain pipe segment 12 is connected to a vertical primary ball valve 14 with a total length of 4 inches for both items 12 and 14, that is connected to a 1.5 inch elbow 15, pointing to the back of the aquarium and connects to a horizontal secondary ball valve 16, which connects to the front of the horizontal tee connector 17, at the base of the vertical overflow main pipe 7. A horizontal piece of pipe 18, connects to the back of the tee connector 17, which is to be connected to existing plumbing. Items 16, 17 and 18 have an approximate total length of 7 inches.

To empty water into from the top water change tank (FIG. 4, 32) into the lower main fish tank (FIG. 4, 38) a ¾ inch pipe system (see FIG. 3) is used.

As depicted in FIG. 3, a drain flange 19, at the bottom of the top water change tank (FIG. 4, 32) connects and secures a 3.5 inch vertical pipe segment 20, that contains a check valve 21, to prevent backflow from the lower main fish tank (FIG. 4, 38). In FIG. 3 this vertical pipe segment 20 connects to an elbow 22, and points towards the back of the aquarium. The elbow 22 connects to a horizontal pipe segment 23, and a ball valve 24, that have a combined length of 3 inches. This segment connects to an elbow 25, and points downward and connects to a vertical nine inch length of pipe 26. At the bottom of pipe 26, an elbow 27, is connected pointing towards the front of the aquarium. This elbow 27, is connected to a 1.5 inch length of horizontal pipe 28, that goes thru upper part of the back of the main fish tank (FIG. 4, 38). In FIG. 3, pipe 28 connects to an elbow 29 that points downward and allows water to run over a splash guard 30, to buffer the entry of water into the bottom main fish tank (FIG. 4, 38).

FIG. 4 is a sectional front view of the shelves, tanks, and plumbing in the aquarium. The outer cabinet walls, top, bottom and cabinet supports have been hidden in this view to reveal the interior parts of the aquarium. Only the upper shelf 43, and the lower shelf 45, are parts of the cabinet. The water change tank 32, has a top tank wall restraint cap, with two equally spaced 18.5" times 14" water access cutouts. The tank wall retainer 31, extends down and around the top of the water change tank 32, by one inch and has a two inch cross piece to add strength to the top of the tank. On the back wall of tie water change tank 32, two inches down and three inches in from the right side of the tank (from a front view perspective) is the center of a 1.5" diameter hole 35, that serves as access for the overflow plumbing into the back of the tank and allows excess water to drain out of the tank. The flat bottom of the water change tank 33, and a bottom tank wall retainer 34, goes around the rim of the bottom of the tank raising the tank up off the shelf 43, by about ¾'s of an inch to prevent condensation on the bottom of the tank. The shelf that the water change tank rests on is 50".times.1".times.22" and has an 8.7".times.5.8" cutout 44, four inches from the right side of the shelf and ¾'s of an inch from the back of the shelf. This cutout allows space for the water change tank 32, transfer line (see FIG. 3) that leads into the main fish tank 38. Three inches from the back of the water change tank and five inches from the left side of the water change tank is the center of a ¾" circular hole 36, that allows the water change tank transfer line to be connected to the bottom of the water change tank via a threaded flange.

Also, in FIG. 4, the main fish tank 38, that has a dimension of 48"×24"×18", rests on a 50"×1"×22" lower shelf 45, that has a 9"×6.5" cutout 46, that starts two inches from the right side of the lower shelf 45, and ¾'s of an inch from the back of the shelf. This cutout allows the main fish tank 38, overflow plumbing to go through the shelf 45, and attach to the main fish tank waste line (see FIG. 2). The main fish tank 38 has a top tank wall restraint cap 37, with two equally spaced 20"×16" water access cutouts. The tank wall retainer 37, extends down and around the top of the main fish tank 38, by one inch and has a four inch cross piece to add strength to the top of the tank. On the back wall of the main fish tank 38, two inches down and seven inches in from the right side of the tank (from a front view perspective) is the center of a 1.5" diameter hole 41, that serves as access for the overflow plumbing into the back of the tank and allows excess water to drain out of the tank. The flat bottom of the main fish tank 39, and a bottom tank wall retainer 40, goes around the rim of the bottom of the tank raising the tank up off the shelf 45, by about ¾'s of an inch to prevent condensation on the bottom of the tank. In the bottom of the main fish tank 39, there is a 1.5" circular hole 42, seven inches to the left of the right side of the tank that allows the main fish tank 38, waste line (see FIG. 2) to enter into the bottom of the main fish tank 38. This allows for quick and easy draining of the main fish tank 38.

Figure 5:
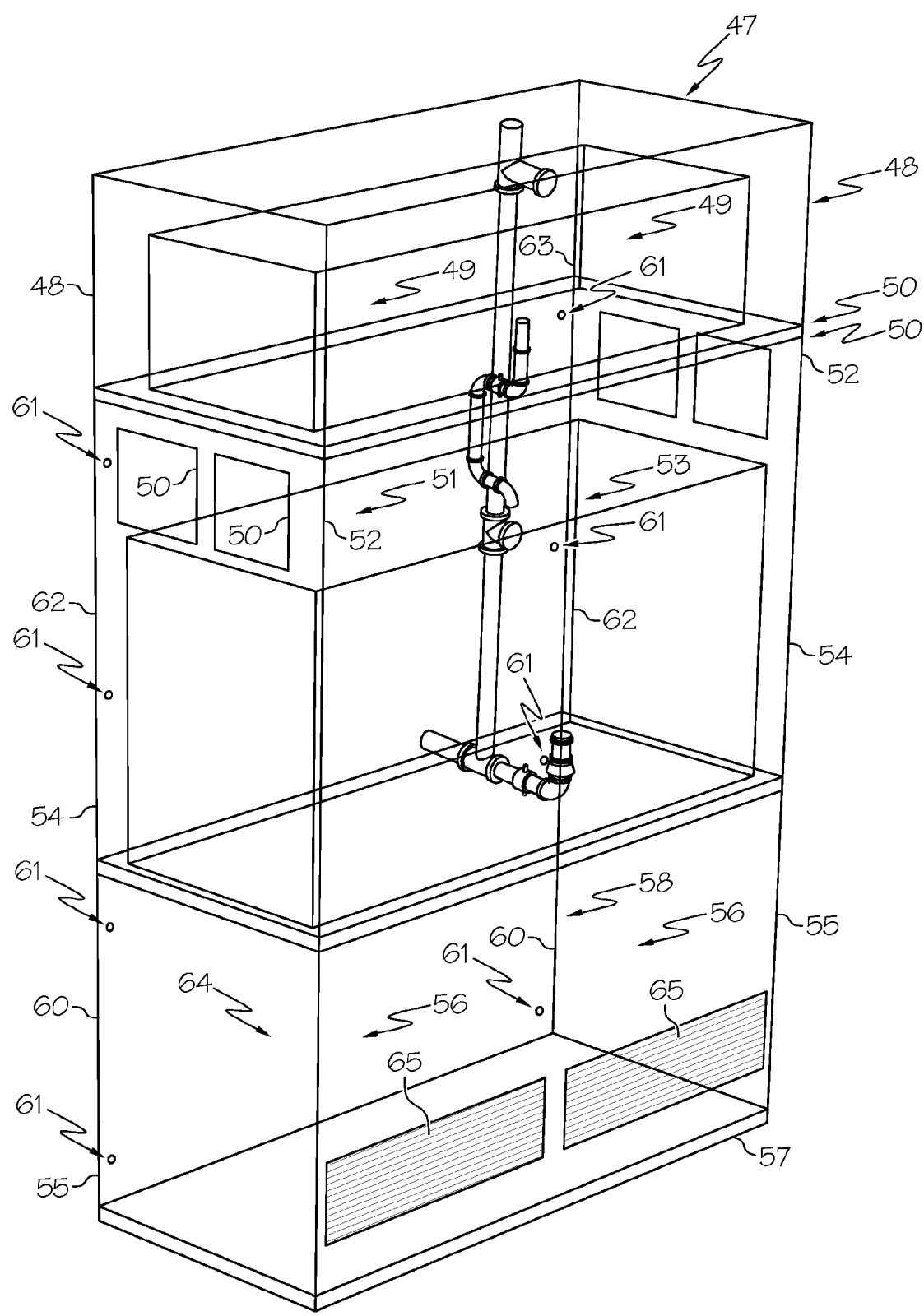
FIG. 5 shows a view of the aquarium from a perspective of slightly above and to the left of the front of the aquarium and cabinet.

FIG. 5 shows a complete wire-frame view of the aquarium water changing and stabilization system from a perspective to the left and slightly above the front of the aquarium. FIG. 5's numbered items point out the components of the aquarium cabinet. The cabinet is made primarily of a wood product. All shelves and wall sections of the cabinet are doweled together for support. The top of the cabinet 47, has a dimension of 50"×22"×1" as do all the shelves of the cabinet. The bottom of the cabinet 57, has a slightly larger dimension of 52"×1"×23" for additional stability. The upper left and right cabinet side panels 48, have a dimension of 22"×14"×1", are doweled into the top of the cabinet 47, and the upper shelf (FIG. 4, 43). Two 24"×15"×0.3" left and right upper cabinet doors 49, provide access to the water change tank cabinet area. Between and behind the upper front cabinet doors 49, is a 3"×14.5"×1" center upper front cabinet door support and stop 63. All cabinet doors use appropriately placed hidden European hinges and have appropriately placed cabinet door handles.

On the front of the cabinet and doweled into the bottom of the upper cabinet shelf (FIG. 4, 43), is a 48.25"×2.6"×1" wood product panel 51. Also, below the upper cabinet shelf (FIG. 4, 43), are a left and right mid cabinet side panels 54, that have a dimension of 22"×35.5"×1" and are doweled into the upper cabinet shelf (FIG. 4, 43) and lower cabinet shelf (FIG. 4, 45). Each of these left and right mid cabinet side panels 54, have two 7"×6"×1" cutouts who's both upper right hand corners begin at 1.8" down from the top of the mid cabinet side panel 54, and three inches and 12 and a half inches respectfully from the right side of the mid cabinet side panel 54. These cutouts provide access to each side of the main fish tank cabinet area. Each of these mid cabinet side panel cutouts are covered with relatively small 8"×7"×0.3" cabinet doors 50, that use appropriately placed hidden European hinges and cabinet door handles. Approximately ¼" below the front cabinet panel 51, is a swing up front access panel 53, that has a dimension of 48.6"×10.8"×0.3" and is connected to the mid cabinet side panels 54, with metal pins 52, that allow this front access panel 53, to swing up and provide access to the front of the main fish tank. When this panel 53, is in the down position, it provides a pleasing aesthetic look to the front of the aquarium cabinet by blocking the view into the interior plumbing and open back of the aquarium.

In FIG. 5, at rear of the mid cabinet section is a left and right mid section "L" strut 62. Each of these struts 62 consists of two pieces of wood product, 3"×35.59"×1" and 5"×35.5"×1" that are doweled and glued together at right angles for strength. The 3"×35.5"×1" side of these struts are attached to the interior wall of the mid cabinet side panels 54, with at least four appropriately placed #6 gauge wood screws.

The lower portion of the aquarium cabinet is designed to allow room 64, for normal aquarium filtration system hardware. At rear of the lower cabinet section is another set of left and right lower section "L" struts 60. Each of these struts 60 consists of two pieces of wood product, 3"×26"×1" and 5"×26"×1" that are doweled and glued together at right angles for strength. The 3"×26"×1" side of these lower section "L" struts 60, are attached to the interior wall of the lower left and right side cabinet side panels 55, with at least four appropriately placed #6 gauge wood screws. These lower cabinet side panels 55, have a dimension of 22"×26"×1" and are doweled into the lower cabinet shelf (FIG. 4, 45) and the cabinet bottom 57. On all of the back-facing five inch wide piece of "L" struts in the mid and lower cabinet sections 62 & 60, that are flush with the backend of the aquarium cabinet side panels and shelves, there are 0.5"×0.5"×1" bolt holes 61, that allow for 7/16" diameter bolts or #30 gauge self anchoring wood screws to be attached through the back of the aquarium cabinet to the building wall where the aquarium is located. The "L" strut bolt holes are located four inches from the top and bottom of the struts and are centered in the back-facing five inch wide piece of the "L" strut. These bolts ensure a secure and stable aquarium that will not tip over or sway when properly bolted to the building wall behind the aquarium cabinet. On the front side of the lower part of the aquarium cabinet are two slot vented 24"×26"×0.3" left and right lower cabinet filtration system access doors 56. There are eight equally spaced 23"×0.45"×0.3" slots 65, that start at about eighteen inches down and are centered on each lower cabinet door. These front lower cabinet doors are attached to the cabinet by appropriately placed hidden European hinges. Appropriately placed cabinet door handles must be on the all cabinet doors for easy opening. Between and behind the lower front cabinet doors 56, is a 6"×2"×1" center lower front cabinet door support and stop 58.

Figure 6:
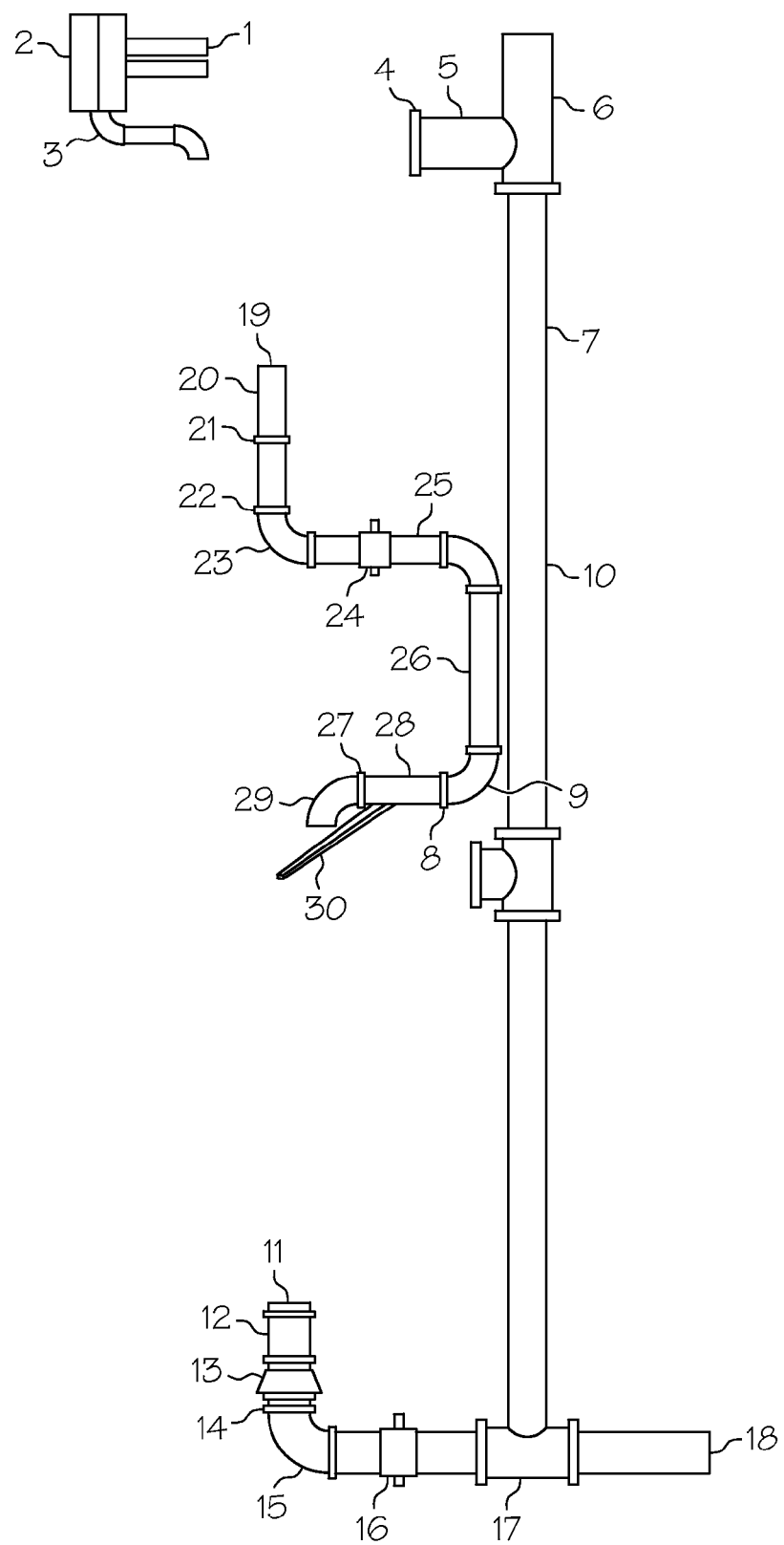
FIG. 6 is a sectional front view of all aquarium plumbing only from a perspective slightly above and to the right of the aquarium.

FIG. 6 is a sectional right side view of the aquarium plumbing only that allows conditioned and stabilized water from the water change tank (FIG. 4, 32) to flow into the lower main fish tank (FIG. 4, 38). This section of plumbing starts with a ¾" double threaded bulkhead fitting 19, that is inserted down into the plumbing access hole located on the bottom of the water change tank (see FIG. 4). This bulkhead 19, is connected to one of two ¾" diameter segments of vertical pipe 20 which includes a ¾" check valve 21 in the middle. The total length of segments 19 and 20 is 3.5 inches. At the bottom of the lower pipe segment 20, is a ¾" elbow 22 that points towards the back of the aquarium at a 90° angle and is attached to horizontal segments of ¾" pipe 23 that has a ¾" ball valve socket 24, in the middle. Segments 23 and 24 have a total length of three inches. Attached to the end of the back portion of segments 23 and 24 is another ¾" elbow that points 90° downward and is attached to a nine inch vertical segment of ¾" pipe 26. The bottom end of this nine inch vertical segment of pipe 26, is attached to a ¾" elbow 27, that points towards the front of the aquarium at a 90° angle and is attached to a horizontal 1.5" length of ¾" diameter pipe 28. At the front end of this horizontal segment of pipe 28, is a ¾" elbow 29, that points downward at a 90° angle and directs the water flowing out of this plumbing system onto a splash guard 30, to prevent splashing within the main fish tank when this plumbing is in use. The splash guard 30, is attached to the back main fish tank wall centered ½" below the elbow 29.

I claim:
1. An aquarium water changing and stabilization system comprising:
  (a) a mixing valve that allows connection to existing hot and cold water plumbing and puts water into an initial water conditioning tank;
  (b) the initial conditioning tank that has plumbing connected to the bottom of it to allow conditioned water to be transferred from this initial conditioning tank to a subsequent fish tank, this plumbing including an initial vertical section containing a check valve preventing water from the subsequent fish tank from flowing back into the initial conditioning tank, this plumbing then has a horizontal segment that points towards the back of an aquarium and contains a ball valve for opening and closing of this plumbing, plumbing that then extends downward to reach just below the top of the subsequent fish tank then turns and points towards the front of the aquarium and enters into the subsequent fish tank through the back with just enough length to allow for a spout that points down into the subsequent fish tank, water that drains from the initial conditioning tank through this plumbing into the top back of the subsequent fish tank exits onto a splash guard located directly below the spout to prevent disturbance of objects and existing water in the subsequent main fish tank;
  (c) combined overflow and waste line for both tanks with a common vent that consists of a large vertical pipe running down the back of both tanks in the aquarium and that has two small segments of horizontal pipes entering into right angle tee connectors pointing towards the front of the aquarium and that allow these short horizontal segments of overflow pipe to enter through the top back side of each tank allowing water to drain out of each tank at a sufficient rate in case of accidental over filling of either tank, bulkheads that connect and secure the horizontal overflow pipe segments to the back of each tank, the venting for the overflow and fish tank waste line that is located at the top of the vertical overflow pipe that runs the length of the aquarium, a subsequent fish tank that has plumbing connected to the bottom of it to allow fish tank water to be quickly drained from the fish tank, a fish tank waste line that has a vertical section containing a check valve preventing water from the overflow pipe from flowing back into the bottom of the fish tank and a ball valve located directly below the check valve that can be opened and closed to start or stop draining water from the fish tank, a fish tank waste line that then has a horizontal segment that points towards the back of the bottom of the aquarium and contains a secondary ball valve that can also be opened and closed to start and stop draining water from the bottom of the fish tank, a dual ball valve fish tank plumbing drain system that serves as a redundant cut-off in case one of the fish tank waste line ball valves fails, a tee connector that is located behind the second ball valve and allows the vertical overflow pipe to connect and join the horizontal segment of fish tank waste line, all overflow and fish tank waste water exits out of a continuing unconstrained segment of pipe beyond the tee connector that is designed to be connected to existing waste line in the building where the aquarium is to be located.

* * * * *